United States Patent [19]

Fassauer

[11] Patent Number: 4,513,688

[45] Date of Patent: Apr. 30, 1985

[54] PELLETIZED MATERIAL FEEDER

[76] Inventor: Arthur L. Fassauer, P.O. Box 124, Canyon, Tex. 79015

[21] Appl. No.: 459,767

[22] Filed: Jan. 21, 1983

[51] Int. Cl.³ .................................... A01K 5/02

[52] U.S. Cl. .................................... 119/52 A; 222/200; 366/196; 366/603

[58] Field of Search ............... 366/182, 194, 195, 196, 366/205, 314, 603; 119/52 A, 52 AF, 52 B, 53, 56 A; 250/208, 209, 565; 356/433, 435; 222/203, 200; 198/953

[56] References Cited

U.S. PATENT DOCUMENTS

| | | | |
|---|---|---|---|
| 1,029,431 | 6/1912 | Elliott | 119/52 A |
| 1,222,556 | 4/1917 | McCormick | 119/52 A |
| 1,458,058 | 6/1923 | Hoppes | 119/52 A |
| 1,487,058 | 3/1924 | Gwinn | 222/203 |
| 2,087,492 | 7/1937 | Williams | 366/194 |
| 2,659,346 | 11/1953 | Paparazzo et al. . | |
| 2,808,029 | 10/1957 | Geerlings . | |
| 2,839,028 | 6/1958 | Routh . | |
| 2,842,096 | 7/1958 | Bradfield . | |
| 3,074,377 | 1/1963 | Spencer . | |
| 3,083,687 | 4/1963 | Slaven . | |
| 3,185,133 | 5/1965 | Bird . | |
| 3,199,493 | 8/1965 | Hart . | |
| 3,244,150 | 4/1966 | Blair . | |
| 3,249,090 | 5/1966 | Ripley . | |
| 3,265,036 | 8/1966 | Kloss . | |
| 3,527,191 | 12/1968 | Kawecki . | |
| 3,581,711 | 6/1969 | Bates . | |
| 3,672,333 | 6/1972 | Bates . | |
| 3,741,162 | 6/1973 | Lopez . | |
| 3,763,826 | 10/1973 | Portelli . | |
| 3,786,786 | 1/1974 | Gravos . | |
| 3,867,194 | 2/1975 | Straube | 366/186 |
| 3,920,224 | 11/1975 | Fassauer . | |
| 4,000,719 | 1/1977 | Richards . | |
| 4,030,707 | 6/1977 | Moreton | 366/194 |
| 4,039,118 | 8/1977 | Kawaoka . | |
| 4,079,699 | 3/1978 | Longmore et al. . | |
| 4,134,365 | 1/1979 | Futers et al. . | |
| 4,181,097 | 1/1980 | Betsuno . | |
| 4,182,273 | 1/1980 | Peterson . | |
| 4,192,256 | 3/1980 | Clugston . | |
| 4,222,728 | 9/1980 | Bacher et al. | 366/77 |
| 4,228,934 | 10/1980 | Carr | 366/196 |
| 4,231,326 | 11/1980 | Hager . | |
| 4,256,054 | 3/1981 | Hitchcock . | |
| 4,284,035 | 8/1981 | White . | |
| 4,292,930 | 10/1981 | Olsen . | |
| 4,315,483 | 2/1982 | Scheidler . | |

*Primary Examiner*—Philip R. Coe
*Assistant Examiner*—Frankie L. Stinson
*Attorney, Agent, or Firm*—Jerry W. Mills; Gregory M. Howison; Nina L. Medlock

[57] ABSTRACT

An animal feeder includes a hopper (20) that stores a quantity of pelletized material and is partially closed at the bottom by a restricting plate (40) that has an orifice (38) extending therethrough and offset from the center of the hopper (20). The orifice (38) extends downwardly and rearwardly into an agitation chamber (32). A rotor (34) having paddles (41), (42) and (43) disposed radially outward thereof, is disposed in the bottom of the agitation chamber (32) for rotation about the central axis thereof. An outlet port (46) allows exit of agitated pelletized material from the agitation chamber for dispensing into an eating bowl (16). The paddles (41)–(43) are shaped such that particles of pelletized matter that may be trapped between the lateral edge of the outlet port (46) and the edge of one of the paddles (41)–(43) are forced upwardly and outwardly from the paddle. This results in the pelletized matter either exiting the outlet port (46) or falling back into the agitation chamber (32). The rotor is manually rotated by a shaft (36) or by an electric motor (74) that is geared down for slow rotation thereof. A photocell (82) senses whether the eating bowl (16) is empty and a photocell (86) senses the presence of daylight to determine the relative time of day. An electronic module (78) operates the electric motor (74) as a function of the photocells (82) and (86).

7 Claims, 11 Drawing Figures

PELLETIZED MATERIAL FEEDER

TECHNICAL FIELD

The invention pertains in general to animal feeders and, more particularly, to a feeder for dispensing pelletized material with minimum agitation.

BACKGROUND OF THE INVENTION

A wide variety of devices have been utilized for dispensing pelletized material such as dog food which consists of large uneven particles of food. These devices have utilized high r.p.m. agitators which require a high torque motor for rotation thereof. The agitators provide a small cross sectional area for rotation through material in an agitation chamber, the material is then dispensed through an orifice in the side of the agitation chamber. An example of these types of feeders is illustrated in U.S. Pat. No. 3,920,224 issued to the present Applicant.

The small cross sectional area of the agitator in the prior art devices is a disadvantage when utilizing manual force to power the agitator or in using low torque motors. Manual operation, as compared to automatic operation, requires an agitator that expels a large amount of pelletized material per each rotation of the agitator thereof. This requires an agitator that has a large surface area to provide additional agitation per rotation, as compared to the automatic devices, which provide a small cross sectional area. One of the disadvantages of a large cross sectional area agitator is that the pelletized material becomes trapped between the agitator itself and the sides of the outlet port through which the matter is expelled. Since the components that agitator assemblies are normally fabricated from are injected molded plastics, pelletized material trapped between the edges of the outlet port and the agitator assembly itself can result in breakage. This can also render manual operation of the agitator assembly very difficult in addition to increasing the required torque from an electrically driven unit.

In view of the disadvantages incurred in manual operation of a pelletized material feeder, there exits a need for an apparatus that alleviates the entrapment of particles between the agitator assembly and the outlet port and reduces the torque by the distributor and dispensing module design.

SUMMARY OF THE INVENTION

The present invention disclosed and claimed herein comprises a pelletized matter dispenser and includes a hopper for storing a supply of the pelletized matter. An agitation chamber is mounted below the hopper for receiving the pelletized matter from the hopper, the agitation chamber having an outlet therethrough to allow passage of agitated pelletized matter. An agitation assembly is disposed in the agitation chamber having at least one paddle for movement through the pelletized material in the agitation chamber adjacent the outlet for agitation of pelletized material therethrough. The paddle and the wall of the agitation chamber are shaped to prevent entrapment of pelletized matter therebetween. An agitating apparatus powers the agitation assembly to provide movement of the agitation assembly through the pelletized matter. An orifice is disposed between the hopper and the distributor and dispensing chamber for partially restricting flow of pelletized matter therebetween such that flow is only restricted when the agitation assembly is not moving.

In another embodiment of the present invention, the agitation assembly has a plurality of paddles disposed about a disk for rotation about a central axis. The agitation assembly is either rotated manually by a shaft with a hand grip mounted thereon or by an electric motor that is coupled to the agitation assembly through a gear reduction mechanism, the motor being of a low torque type.

In yet another embodiment of the present invention, the pelletized matter is dispensed into a receiving bowl and an apparatus is provided for sensing when the receiving container is empty. This apparatus is disposed in the bottom of the receiving container for sensing light that is only allowed to impinge upon the apparatus when the receiving container is empty. A predetermined portion of pelletized matter is then dispensed into the receiving container.

In a further embodiment of the present invention, an electrical circuit is provided for automatically dispensing matter into the receiving container as a function of daylight. The circuit senses the presence of daylight for a predetermined period of time prior to dispensing pelletized matter into the receiving container. In addition, the circuit senses the absence of light for a period of time to determine that the circuit is to be reset to await the cyclical occurrence of light due to sunrise. Other aspects of the present invention will become apparent hereinafter.

BRIEF DESCRIPTION FO THE DRAWINGS

For a more complete understanding of the present invention and the advantages thereof, reference is now made to the following description taken in conjunction with the accompanying Drawings in which.

Figure 6:
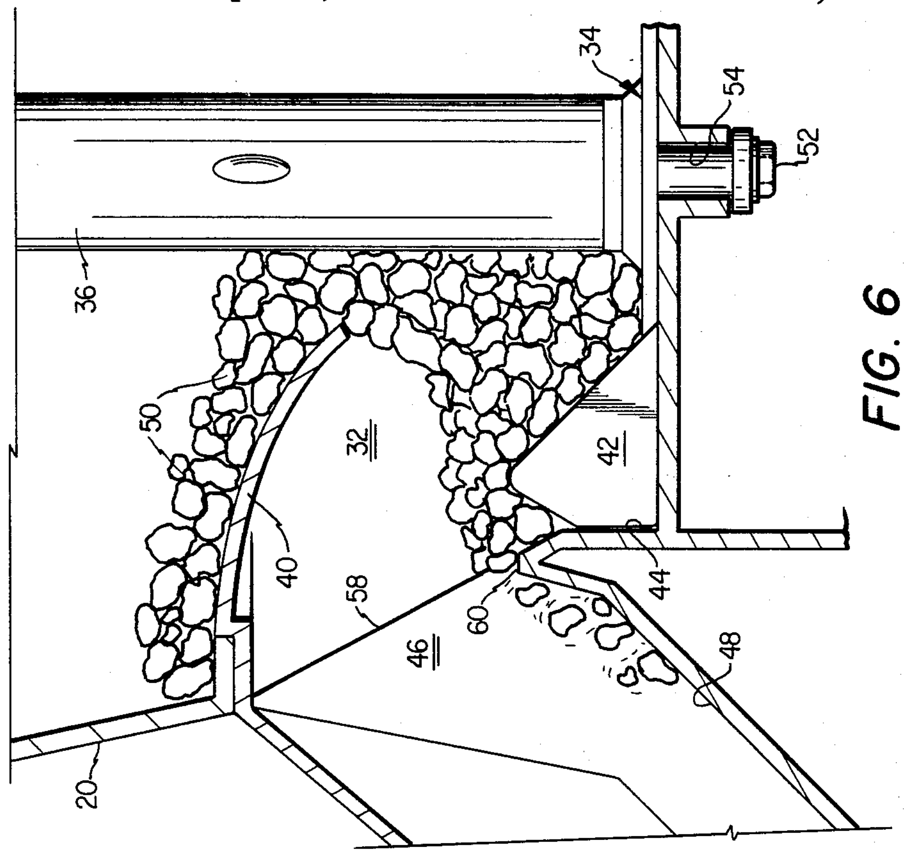
Figure 4:
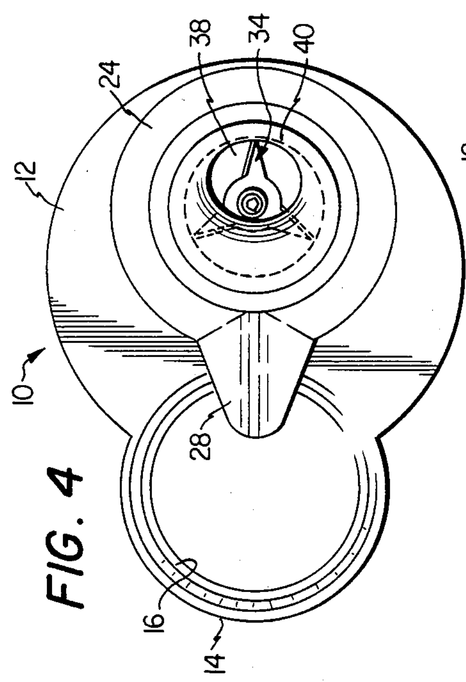
Figure 5:
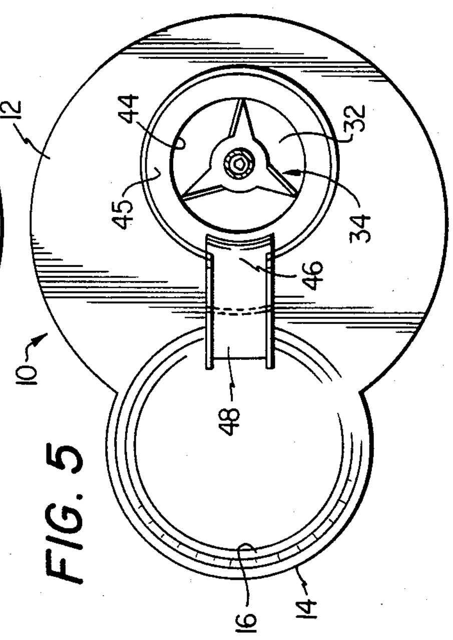
Figure 7:
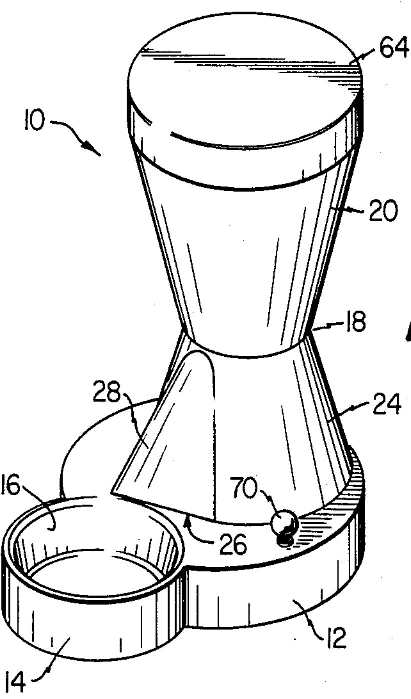
Figure 8:
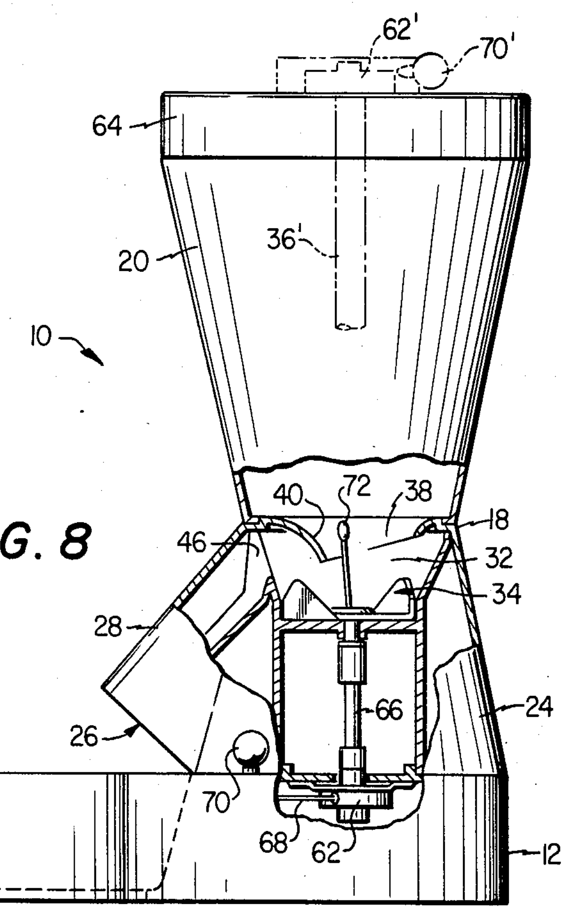
Figure 9:
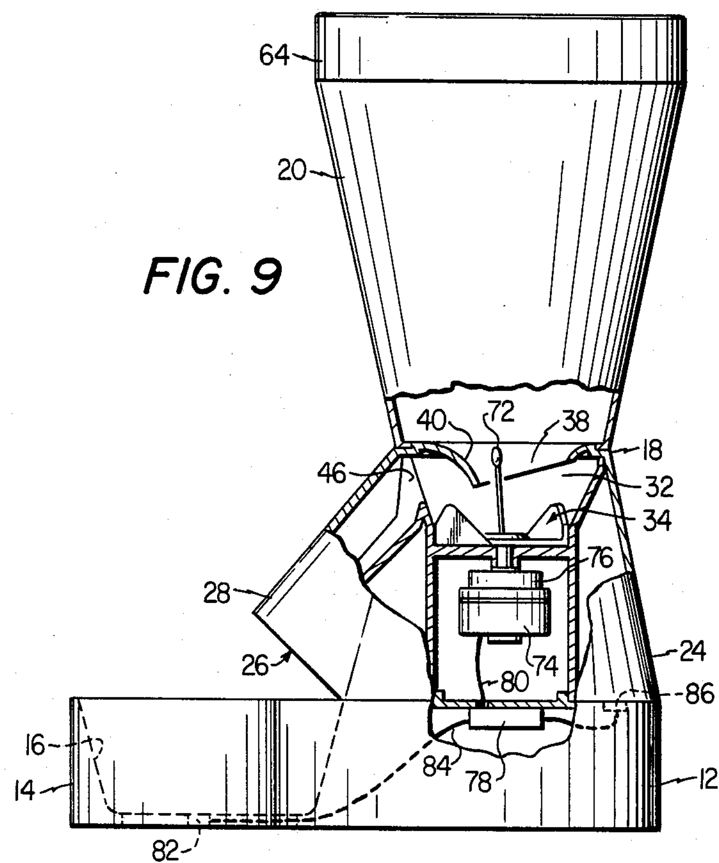
Figure 10:
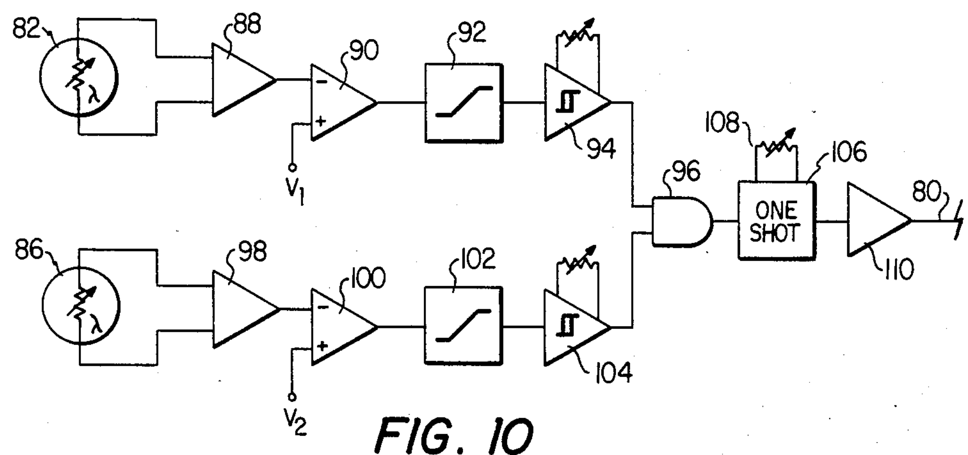

FIGS. **3*a* and 3*b*** illustrate perspective views of two embodiments of the agitator assembly;

FIG. 4 illustrates a top view of the feeder of the present invention with the hopper removed;

FIG. 5 illustrates a top view of the agitation chamber;

FIG. 6 illustrates an enlarged sectional view of the agitation chamber and agitator assembly with pelletized material therein;

FIG. 7 illustrates a perspective view of an alternate embodiment of the present invention with a recoil type rotation device;

FIG. 8 illustrates a sectional view of the agitation chamber of the embodiment of FIG. 7;

FIG. 9 illustrates a sectional view of an alternate embodiment of the present invention utilizing an electric motor and sensing device; and FIG. 10 illustrates a schematic diagram of the circuit for driving the electric motor as a function of the sensing device of FIG. 9.

DETAILED DESCRIPTION OF THE INVENTION

Figure 1:
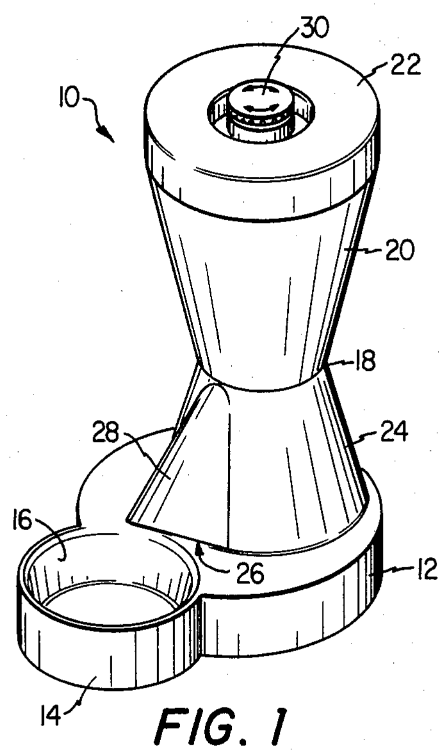
FIG. 1 illustrates a perspective view of the pelletized feeder of the present invention.
Figure 2:
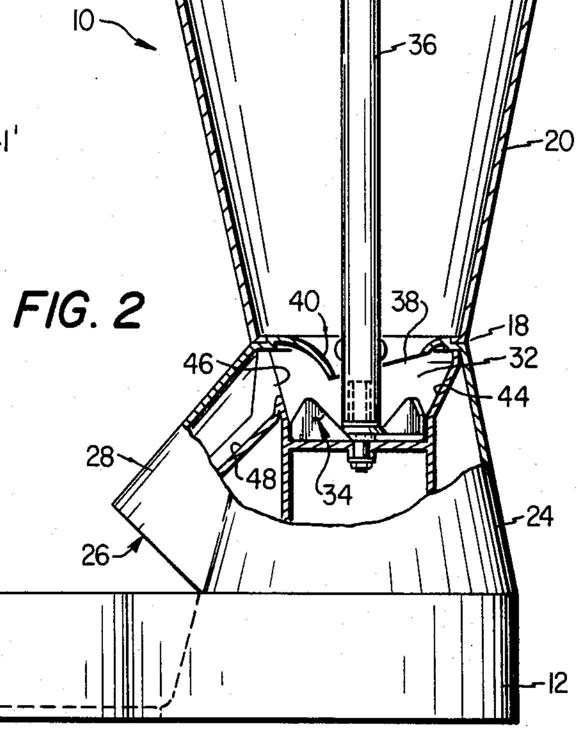
FIG. 2 illustrates a sectional view of the hopper and agitation chamber of the feeder.

Referring now to FIG. 1, there is illustrated a perspective view of a pelletized material feeder 10 of the present invention. The feeder 10 includes a cylindrical base 12 having a cylindrical projection 14 extending therefrom. The cylindrical projection 14 houses an eating bowl 16. The eating bowl 16 may be formed integrally with the base 12 as shown, or may be removable or include a removable liner for apparent sanitary reasons. Mounted on the top portion of the base 12 is an upstanding hopper and feeder module 18 including a conical hopper section 20 having upwardly and outwardly extending walls and which is closed at the top by a removable cylindrical cover 22. Between the hopper section 20 and the base 12, there is feed distribution section 24 having downwardly and outwardly extending walls. A feed distribution opening 26 is formed in the feed distribution section 24 and is partially enclosed by a cover member 28. A manual control knob is mounted on the cover 22 to allow an operator to manually distribute food through the opening 26, as will be described hereinbelow. Referring now to FIG. 2, there is illustrated a side cross-sectional view of the feeder 10 of FIG. 1. The feed distribution section 24 has an agitation chamber 32 for receiving food from the hopper section 20. A rotor 34 is rotationally mounted in the bottom of the agitation chamber 32. A shaft 36 is connected between the control knob 30 and the rotor 34 and co-rotatable therewith. The shaft 36 allows the rotor 34 to be manually rotated by the control knob 30. Pelletized matter disposed in the hopper section 20 is allowed to fall into the agitation chamber 32 through an orifice 38 disposed in a restricting plate 40. The orifice 38 disposed through the restriction plate 40 has its radial center offset from the center of the hopper section 20 through which the shaft 36 passes and the orifice 38 is tilted rearwardly from the opening 26 in the agitation chamber 32 such that pelletized material flowing from the hopper section 20 to the agitation/Dispensing chamber 32 is oriented toward the rear of the agitation chamber 32 with the respect to the opening 26.

Figure 3A:
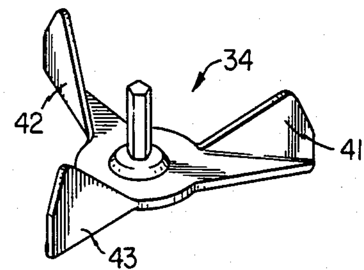
Figure 3B:
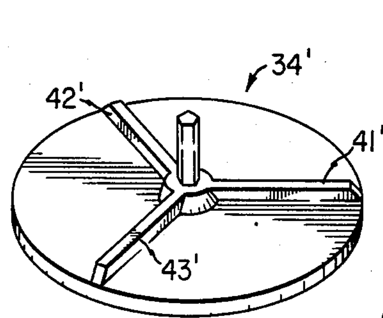

Referring now to FIGS. 3*a* and 3*b*, there is illustrated a perspective view of the rotor 34 of FIG. 2. The rotor 34 has three paddles 41, 42, 43 disposed about the outer periphery thereof and radially oriented. Each of the paddles is spaced an even number of degrees apart. In FIG. 3*a*, each paddle 41–43 provides a large cross-sectional area perpendicular to the direction of rotation for maximum agitation of pelletized material disposed in the agitation chamber 32. With the large cross-sectional area paddles 41–43, it is possible to agitate a sufficient amount of pelletized material with minimum rotation for disposal through an opening 46 disposed in the side of the agitation chamber 32. The pelletized matter is then guided down a ramp through the opening 26 into the eating bowl 16. The large cross sectional area of the paddles 41–43 allows a sufficient portion of pelletized matter to be agitated through the opening 46 with only a partial rotation of the rotor 34. This is due to the fact that the large cross-sectional area results in increased agitation as compared to that produced by prior art devices such as that described in U.S. Pat. No. 3,920,224. However, the disadvantage is that particles of the pelletized matter have a tendency to become trapped between the outermost edge of the paddle and the lateral edges of the opening 46, as will be described hereinbelow. In addition, U.S. Pat. No. 3,800,745 issued to Applicant describes an automatic feeder that relates to and about a rotational feeding device about a central axis, which disclosure is incorporated herein by reference.

The agitator of FIG. 3*b* illustrates a rotor 34′ that utilizes low profile paddles 41′, 42′ and 43′ disposed similar to paddles 41–43. The paddles 41′–43′ have a thickness essentially equal to that of the paddles 41–43 but with a different profile. The top edges of the paddles 41′–43′ are parallel to the bottom edges thereof and the radial edges thereof are slanted at a 45 degree angle. The operation of the rotor 34′ is similar to the rotor 34, the operation of which will be described hereinbelow.

Referring now to FIG. 4, there is illustrated a top view of the feeder 10 with the cover 22, the control knob 30, the shaft 36 and the hopper section 20 removed. FIG. 4 more clearly illustrates the position of the orifice 38 in the restricting plate 40. In addition, it can be seen that the rotor 34 is positioned such that each of the paddles 41–43 upon rotation of the rotor 34 are essentially proximate the outer peripheral walls of the agitation chamber 32. This maximizes the efficiency of agitation per each revolution of the rotor 34. It should be understood that manual operation of the rotor 34 normally requires only a partial rotation of the rotor 34. As can be seen in FIG. 4, one of the paddles on the rotor 34 is normally present directly beneath the orifice 38 such that pelletized matter resting upon the paddle is agitated by rotation thereof.

Referring now to FIG. 5, there is illustrated a top view of the feeder 10 of FIG. 4 with the restricting plate 40 and the feed distribution section 24 removed thereby exposing the agitation chamber. 32. The agitation chamber has a bottom section 44 with vertical cylindrical walls and an upper section 45 with an upwardly and outwardly tapered wall. The outlet port 46 is disposed through the upper section 45. The taper of the upper section 45 allows pelletized material that is disposed in the bottom section 44 to be agitated by the rotor 34 and dispelled upward and outwardly along the tapered section 45.

Referring now to FIG. 6, there is illustrated an expanded sectional view of the agitation chamber 32 with pelletized matter 50 disposed therein. The rotor 32 is held adjacent the bottom section 44 of the agitation chamber 32. A teflon bushing is disposed between the head of the bolt 52 and the sides of the hole 54 to provide a dry bearing.

When the shaft 36 is not being rotated, the pelletized matter 50 is prevented from exiting through the outlet port 46 and down the ramp 48 into the eating bowl 16 by the shape of the restricting plate 40. The restricting plate 40 has a reduced orifice 38 disposed therethrough that causes pelletized matter 50 to be "clumped" together. That is, the downward force of the pelletized matter 50 in the hopper section 20 does not exert sufficient lateral force to cause movement of the pelletized matter 50 through the outlet 46. This fact depends in part on the high degree of friction existing between individual particles of the pelletized matter 50 which prevents free flow thereof. The shape of the agitation chamber 32 and the restricting plate 40, in addition to the shape of the pelletized matter, are also responsible for this "clumping". Since the orifice 38 is oriented toward the rear of the agitation chamber 32, the pelletized matter 50 is further prevented from inadvertently exiting the agitation chamber 32 through the outlet port 46.

When the rotor 32 is rotated, the paddle 42 is urged through the pelletized matter 50. The paddle 42 is shaped such that a large cross-sectional area is urged through the pelletized matter 50. This large surface area directs a force through the pelletized matter 50 that is oriented along the direction of rotation. Since the bottom section 44 of the agitation chamber 32 is essentially filled with pelletized matter 50, the force imparted upon the pelletized matter adjacent the surface of the paddle 42 is met with opposing force by pelletized matter 50 that is disposed nearby. This opposing force results in an upward movement of the pelletized matter 50 to prevent crushing thereof. This upward movement allows the pelletized matter 50 that is agitated by the paddle 42 to move upward and over the top of the paddle 42 in an undulating motion. The paddle 42 is shaped such that the uppermost portion thereof is adjacent the lowermost edge of the outlet port 46. This results in displacement of pelletized matter 50 above the lowermost edge of the outlet port 46 resulting in expulsion through the outlet port 46 and down the ramp 48 to the eating bowl 16. It is important that the passage of the paddle 42 through the pelletized matter 50 results in movement of the pelletized matter upward and outward along the walls of the upper section 45.

When the paddle 42 is rotated past the outlet 46, particulate matter is urged over the lowermost edge thereof and down the ramp 48. However, the port 46 has a lateral edge 58 in addition to a lowermost edge 60. When the paddle 42 is rotated past the lowermost edge 60 and passes the intersection of the lowermost edge 60 and the lateral edge 58, the shape of a paddle 42 becomes important in that pelletized matter 50 can be wedged between the paddle 42 and the lateral edge 58 since, as described above, the pelletized matter is uneven in shape due to the normally roughened surface thereof.

The paddle 42 is shaped such that the uppermost portion thereof forms a V shape with the portion of the wall of the upper section 45 disposed immediately beneath the lowermost edge 60 of the outlet port 48. This shape provides an angle of "repose" that allows pelletized matter wedged between the paddle 42 and the lateral edge 58 an additional degree of freedom. That is, pelletized matter can move upward and outward along the lateral edge 58 thereby preventing entrapment of pelletized matter therebetween. Since entrapment of pelletized matter can result in breakage of the rotor 32 or an increased resistance experienced by the operator of the feeder, the V shape substantially alleviates entrapment. This angle of repose is an important aspect of the present invention in that it provides an anti-jam capability for the animal feeder. The manual operation of the rotor 32 in the feeder with the higher cross-sectional area on the paddle 42 requires a higher given force per degree of rotation of the shaft 36. This increased surface area of the paddle also results in a higher opposing force as the paddle moves through the pelletized matter 50. The addition of an entrapped particle of pelletized matter 50 between the paddle and the lateral wall 58 can substantially impede movement of the rotor 32 such that there is either breakage of the paddle 42 or a large amount of breakage of the pelletized matter 50. The breakage of the pelletized matter 50 is undersirable in that this pelletized matter normally crumbles and falls to the bottom of the agitation chamber 32 which is not capable of expulsion through the outlet port 46. Therefore this crumbled pelletized matter 50 has a tendency to build up until the feeder is cleaned.

Referring now to FIGS. 7 and 8, there is shown an alternate embodiment of the feeder 10 of FIG. 1 utilizing a recoil spring rotation device 62. Since the manual control knob 30 of FIG. 1 is not necessary, a blank cover 64 is mounted on the top of the hopper 20 to protect the contents thereof. The recoil spring rotation device 62 is mounted in the base 12 with the rotational axis thereof directly in line with the rotational axis of the rotor 34. A shaft 66 couples the recoil spring rotation device 62 with the rotor 34 and is co-rotatable therewith. The recoil spring rotation device 62 is operated by a pullcord 68 that is connected to a pull knob 70 mounted exterior to the base 12. When the pull knob 70 and the pullcord 68 are retracted from the recoil spring rotation device, the shaft 66 is forced to rotate in one direction only.

Release of a pull knob 70 allows the pullcord 68 to retract wherein the recoil spring rotation device rotates the shaft 66 in the opposite direction. Therefore, the recoil spring rotation device 62 rotates the shaft 66 and the rotor 34 in both directions to thereby agitate the matter in the chamber.

The rotor 34 has an agitator 72 mounted on the upper surface thereof and extending into the orifice 38. The agitator 72 is offset from the rotational center of the rotor 34. The agitator 72 is operable to prevent clogging of pelletized material flowing through the orifice 38. In the feeder 10 of FIGS. 1–6, the shaft 36 prevents clogging of the orifice 38 by the slight "wobble" that is present with a normally manufactured shaft. This wobble as friction also presents bridging of the orifice 38 by pelletized matter since it presents a slight agitation. This slight agitation presents a constant feed of material through the orifice 38 into the chamber 32. Alternately, the portion of the shaft 36 passing through the orifice 38 can have an irregular shape to further agitate material, such as slight ridges. This is due to the fact that the shaft 36 has inherent imperfections therein which prevent perfect rotation thereof.

An alternate embodiment of the recoil spring rotation device 62 is illustrated by phantom lines. A recoil spring rotation device 62' is mounted on the top 64 of the feeder 10 and connected to the rotor 34 through a shaft 36'. A pull knob 70' is mounted on the device 62' for rotation thereof. This alternate embodiment allows activation of the feeder 10 without having to reach down to the base 12 in addition to utilizing the "wobble" in the shaft 36' for agitation of the pelletized matter passing through the orifice 38.

Referring now to FIG. 9, there is illustrated a sectional view of an alternate embodiment of the present invention. The alternate embodiment illustrated in FIG. 9 is similar to the embodiment of FIG. 8 with the exception that the rotor 34 is rotated by an electric motor 74. The electric motor 74 is coupled to the rotor 34 through a gear box 76 that provides a reduction gear ratio. Since the rotor 34 is operable to dispense pelletized matter with only a fraction of a full rotation thereof, the electric motor 74 can incorporate a very low torque motor which is geared down through the reduction gears in the gear box 76 to provide this rotation. The electric motor 74 is controlled by an electronic module 78 that is connected to the motor 74 through a connecting wire 80. The electronic module 78 is connected to a photocell 82 through a connecting wire 84 to provide feedback for operation of the motor 74. The electronic module 78 is operable to sense the presence of light impinging upon the surface of the photocell 82 which is indicative that the feeding bowl 16 is empty. With detection of the presence of an empty bowl and a timing function internal to the electronic module 78, the electric motor 74 can be activated to provide a predetermined amount of rotation to thereby dispense a predetermined amount of pelletized material into the eating bowl 16. The presence of pelletized matter in the eating bowl 16 inhibits the transmission of light to the surface of the photocell 82 thus indicating to the electronic module 78 that pelletized matter has been dispensed into the eating bowl 16. Alternately, the module 78 is operable to control the motor 74 to only place material into the bowl until the photocell 82 is covered. In this manner, only a small amount of pelletized matter is contained in the bowl at any given time.

A second photocell 86 is mounted on the base 12 to sense the presence of daylight for allowing the electronic module 78 to sense the time of day such that dispensing of pelletized matter into the eating bowl 16 can be synchronized with the time of day. For example, feeding can be adjusted such that pelletized matter is dispensed only in the morning after a predetermined amount of sunrise has been detected. This alleviates the need for a clock or mechanical timer that periodically dispenses the pelletized matter.

Referring now to FIG. 10, there is shown a block diagram for the electronic module 78 and the photocells 82 and 86 that combine to operate the electric motor 74. The photocell 82 and the photocell 86 are both photoconductive cells that can be fabricated of cadmium sulfide which vary their electrical resistivity in accordance with the radiant energy received. The photoconductive cell 82 is connected to the input of an amplifying circuit 88 that employs operational amplifiers. An example of this type of amplifier is found in "Linear Applications" National Semiconductor Corp. Volume 1, AN 20-5 (1969). The voltage output by the amplifier 88 is proportional to the resistance of the photoconductive cell 82. The output of the amplifier 88 is input to a comparator 90 that compares the voltage level output by the amplifier 88 with a reference voltage $V_1$. When the voltage output of the amplifier 88 exceeds $V_1$, the output of the comparator 90 changes logic states from low to high. The comparator 90 is of the type LM111 manufactured by National Semiconductor Corp.

The output of the comparator 90 is input to an integrator 92 that integrates the amount of time that the output of the comparator 90 is switched to a logic "high" state. The integrator 92 has an integration time constant that determines the rate of voltage increase on the output thereof. The integrator 92 is a conventional type integrator such as that shown in "Linear Applications", Volume 1 AN 20-4, National Semiconductor Corp. (1969). The integrator 92 is operable to output an increasing voltage during the time that the output of the comparator 90 is in a logic "high" state. When the comparator 90 resumes a logic "low" state, the output of the integrator 92 decreases according to another time constant which determines the rate of voltage decrease. The time constant for the increasing and decreasing voltages can be either internally set or externally adjustable.

The output of the integrator 92 is input to a Schmidt trigger circuit 94 that provides a "high" logic state when the voltage output of the integrator 92 exceeds a first threshold and the Schmidt trigger 94 outputs a logic "low" state when the output of the integrator 92 falls below a second threshold. The first and second thresholds for the Schmidt trigger 94 can be adjusted by adjusting reference voltages therein. The Schmidt trigger circuit 94 is of the type LM3900 manufactured by National Semiconductor Corp. and described in "Linear Applications", Volume 1 AN 32-12, National Semiconductor Corp. (1970). The output of the Schmidt trigger 94 is input to one input of AND gate 96 to provide a gating function, as will be described hereinbelow. The AND gate 96 is of a type 7408 manufactured by Texas Instruments, Inc.

The photoconductive cell 86 is input to an identical circuit and the output voltage thereof processed in a similar manner to that of the photoconductive cell 82. The output of the photoconductive cell 86 is input to an amplifier circuit 98 similar to the amplifier 88 and the output of the amplifier 98 is input to the negative input of a comparator 100. The reference input for the comparator 100 is connected to a reference voltage $V_2$. The output of the comparator 100 is input to an integrator 102 similar to the integrator 92. However the integrator 102 has the internal time constants thereof adjusted to provide a different timing function from that afforded by the time constants in the integrator 92, as will be described hereinbelow. The output of the integrator 102 is input to a Schmidt trigger 104 similar to the Schmidt trigger 94. The output of the Schmidt trigger 104 is input to the other input of the AND gate 96.

The output of the AND gate 96 is input to the input of a one shot circuit 106. The one shot circuit 106 can be of a type 74123 manufactured by Texas Instruments, Inc. and provides an output pulse of a preset duration for each positive transition occurring in the output of the AND gate 96. The one shot 106 is variable through a control 108 that adjusts the pulse width output by the one shot 106. The output of the one shot 106 is input to a driver amplifier 110 that is of the type LH002 manufactured by National Semiconductor Corp. The driver amplifier 110 provides a high current output that drives the electric motor 74 through the connecting wire 80.

The circuit of FIG. 10 is operable to sense the variable resistance of the photoconductive cells 82 and 86 and drive the motor as a function thereof. For example, light impinging on the photoconductive cell 82 as a result of the removal of pelletized matter in eating bowl 16 results in an increase in resistance with a resulting voltage increase that is input to the comparator 90. Depending upon the reference voltage $V_1$ input to the comparator 90, the level of light required to trigger the comparator 90 can be adjusted to a predetermined intensity. The output of the comparator 90 that is input to the integrator 92 is operable to prevent triggering of the Schmidt trigger 94 until external radiant energy has impinged upon the photoconductive cell 82 for a predetermined amount of time. This predetermined amount of time is set by the time constants within the integrator 92 as described above. the integrator 92 prevents the presence of momentary increases in intensity incident upon the surface of the photoconductive cell 82. For example, when an animal is eating out of the eating bowl 16, inadvertent movement of food that uncovers the surface of the photoconductive cell 82 will not trigger the Schmidt trigger 94 until the photoconductive cell 82 has been uncovered for a preset period of time determined by the internal time constants of the integration circuit 92.

The circuitry connected to the photoconductive cell 86 is identical to the circuitry connected to the photoconductive cell 82 with the exception of the reference voltage $V_2$ and the internal time constants of the integrator 102. The photoconductive cell 86 is operable to sense the presence of sunlight. It is important in the operation of this photoconductive cell that stray light such as that from automobiles and the like does not trigger the unit. For this reason, the duration of time that the photoconductive cell is on must be rather long. For example, the level of light necessary to trigger the comparator 100 must be present for a duration of time on the order of one to two hours whereas the duration of time for the photoconductive cell 82 to exceed the threshold of the comparator 90 is on the order of 15 minutes to 30 minutes.

The AND gate 96 is operable to require that both the Schmidt triggers 104 and 94 be triggered in order to trigger the one shot 106. Once the one shot 106 is triggered, the only way to retrigger the one shot 106 is to have either the output of the Schmidt trigger 94 or 104 return to the logic "low" state and then again return to the logic "high" state to again output a positive transition from the AND gate 96. The integrator 92 or the integrator 102 can be adjusted such that once the integrator 92 has integrated up to a sufficient level to trigger the Schmidt trigger 94 to a "high" logic state, an additional duration of time is required for the integrator 92 to decay to the lower threshold of the Schmidt trigger 94 to return the output thereof to a logic "low" state. This time period can be adjusted on the order of ten to twelve hours such that there can only be one feeding per day. For example, when the sun initially rises, it must irradiate the photocell 86 for a certain duration of time before the output of the Schmidt trigger 104 is increased to a logic "high" state. This time is in the order of one to two hours. At this time, assuming the eating bowl 16 to be empty, the photoconductive cell 82 has exceeded the threshold of the comparator 90 for a sufficient time to allow the integrator 92 to integrate to a level that changes the output of the Schmidt trigger 94 to a logic "high" state. Under this condition, the transition of the Schmidt trigger 104 causes the output of the AND gate 96 to make a positive transition thereby triggering the one shot 106. At this point in time, the electric motor 74 is activated to rotate the rotor 34 over only a portion of one cycle. This results in a portion of pelletized matter being dispensed into the eating bowl 16. After the electric motor 74 has stopped, the pelletized matter in the eating bowl is available for an animal's consumption. Once the photoconductive cell 82 is covered and the comparator 90 is returned to a logic "low" state to prevent the integrator 92 from continued integration, the output voltage on the integrator 92 begins to decay until the voltage falls below the low threshold on the Schmidt trigger 94. This decay can be set such that it requires approximately ten to twelve hours to "reset" the Schmidt trigger output 94, that is, the integrator voltage falls below the low threshold thereof. During this time, of course, the output of the Schmidt triggers 104 and is a logic "high" and the output of the output of the AND gate 96 is also a logic "high" such that no positive transition occurs on the input to the one shot 106. If the duration of the decay in the integrator 92 is long enough, the sun will have set and the output of the Schmidt trigger 104 will have changed states from a logic "high" to a logic "low" before the Schmidt trigger 94 has changed states. The cycle then repeats itself again.

In an alternate embodiment, the one shot 106 can be removed or bypassed such that the presence of light on the photocell 82 is operable to drive the motor 74. The motor 74 only operates until the photocell 82 is covered up by pelletized matter dispensed into the feeding bowl. This is reflected in that the output of the comparator 90 make a transition to a "low" state thereby allowing the integrator 92 to decay below the threshold of the Schmidt trigger circuit 94. The various time constants, as described above, can be adjusted such that motor 74 does not turn on until the bowl has been empty for a duration of time of about one hour. Then the motor 74 is activated until it covers up the photocell 82. The motor 74 can then be stopped instantaneously or allowed to run for an additional time on the order of a few seconds or one minute. In this manner, removal of the pelletized matter from the feeding bowl results in a "refill" in approximately one hour and then the cycle repeats itself. This allows the bowl to only contain a small amount of pelletized matter at any given time.

In summary, there has been provided an animal feeder that has a rotor disposed in an agitation chamber having upward and outwardly tapered walls. The rotor is shaped such that particulate matter adjacent the outer wall of the agitation chamber is forced upward and outwardly until the pelletized matter is adjacent an outlet in the agitation chamber. When the pelletized matter is proximate to both the rotor and the lateral edge of the outlet, the paddles disposed on the rotor are shaped such that pelletized matter that would tend to be entrapped between the lateral edge and the paddles is forceably pushed upward and outwardly such that it either exits the outlet or returns to the innermost portion of the agitation chamber. This shape of the paddle prevents jamming that can result from the slow rotation of the rotor.

Although the preferred embodiment has been described in detail, it should be understood that various changes, substitutions and alterations can be made therein without departing from the spirit and scope of the invention as defined by the appended claims.

What I claim is:

1. A pellitized matter dispenser, comprising:

a hopper for storing the pellitized matter;

an agitation chamber mounted below said hopper and having upwardly and outwardly tapered sides in an inverted frusto-conical shape, said agitation chamber having a quadrilateral outlet port disposed through the upwardly tapered side thereof to allow passage of agitated pellitized matter;

an agitation assembly disposed on the bottom of said agitation chamber and having:

a rotating base rotatably mounted in the bottom of said agitation chamber and parallel therewith, and a plurality of paddles disposed on the surface of said rotating base and radially oriented to the outer periphery thereof and perpendicular to the surface thereof, said paddles having two flat surfaces directed perpendicular to either direction of rotation of said rotating base;

each of said paddles having a radial edge thereof tapered inwardly and upwardly from the bottom of said chamber such that a V configuration is formed with the outward tapered walls of said chamber beneath the bottom edge of said outlet port, said radial edge urging the pellitized matter in said agitation chamber upward along the upwardly tapered walls of said chamber during rotation of said agitation assembly to exit said outlet port, the movement of the pellitized matter along the tapered walls in response to said radial edge moving through the agitation chamber allowing a substantial quantity of pellitized matter to be dispensed for each passage of one of said paddles proximate said outlet port;

means for rotating said agitation assembly at a low revolution rate; and means for restricting flow of pellitized matter from said hopper to said agitation chamber when said agitation assembly is not rotating, said means for restricting allowing flow of particulate matter when said agitation assembly is rotating such that the amount of pellitized matter dispensed through said outlet port is replenished in said agitation chamber.

2. The pelletized matter dispenser of claim 1 wherein said means for rotating comprises means for manually rotating.

3. The pelletized matter dispenser of claim 2 wherein said means for manually rotating said agitation assembly comprises:

a longitudinal shaft passing through said hopper into said agitation chamber and attached to said rotating base on the rotational axis thereof; and a hand grip for manually rotating said shaft such that said rotational base is also rotated.

4. The apparatus of claim 2 wherein said means for manually rotating comprises:

a shaft co-rotatable with said base in said agitation chamber;

a recoil spring wound about said shaft; and means for manually tensioning said recoil spring for rotation of said shaft when said spring is tensioned, said shaft freely rotating when said spring is not tensioned.

5. The pelletized matter dispenser of claim 1 wherein said means for rotating comprises:

a low torque electric motor; and a gear box for reducing the turns ratio of said motor for driving said agitation assembly.

6. The pellitized matter dispenser of claim 1 wherein said means for restricting flow comprises a plate disposed between said hopper and said agitation chamber and having a reduced orifice therethrough for restricting flow of pellitized matter, said orifice offset from the center of said agitation chamber and away from said outlet to direct flow of pellitized matter to the portion of said agitation chamber furthest from said outlet, the forwardmost portion of said orifice extending downward into said agitation chamber relative to the rearwardmost portion such that the plane of said orifice has the perpendicular axis thereof directed toward the rear and lowermost portion of said chamber such that the flow of pellitized matter is directed toward the rear of said chamber, the forwardmost portion of said orifice positioned with respect to the bottom of said agitation chamber to restrict forward flow and facilitating clumping of the pellitized matter.

7. A pellitized matter dispenser, comprising:

a hopper for storing the pellitized matter;

an agitation chamber mounted below said hopper and having upwardly and outwardly tapered sides in an inverted frustro-conical shape, said agitation chamber having a quadrilateral outlet port disposed through the upwardly tapered side thereof to allow passage of agitated pellitized matter;

an agitation assembly disposed on the bottom of said agitation chamber and having:

a disc shaped rotatable base rotatably mounted on the bottom of said agitation chamber and parallel therewith, a plurality of paddle shaped members radially oriented on the outer periphery of said base and perpendicular to the surface thereof for agitation of pellitized matter in said agitation chamber, said paddles having the planar surface thereof mounted radially and perpendicular to the planar surface of said base such that the planar surface thereof perpendicular to the direction of rotations, the outer radial edge thereof rotatable about the periphery of said agitation chamber, each of said paddles having the radial edge thereof tapered inwardly and upwardly from the bottom of said chamber such that a V configuration is formed with the outward tapered walls of said chamber beneath the bottom edge of said outlet port, said radial edge urging the pellitized matter in said agitation chamber upward along the upwardly tapered walls of said chamber during rotation of said agitation assembly to exit said outlet port, the movement of the pellitized matter along the tapered walls in response to said radial edge moving through said agitation chamber allowing a substantial quantity of pellitized matter to be dispensed for each passage of one of said paddles proximate said outlet port;

a longitudinal shaft passing through said hopper and said agitation chamber and co-rotatable with said agitation assembly;

a gripping knob mounted on the end of said shaft opposite said agitation assembly for manual rotation of said shaft and said agitation assembly at a low revolution rate; and a plate disposed between said hopper and said agitation chamber having a reduced orifice therethrough for restricting free flow of pellitized matter from said hopper to said agitation chamber, said orifice offset from the center of said agitation chamber and away from said outlet, the lip of said orifice nearestmost said outlet extending downward into said agitation chamber relative to the furthermost lip of said orifice such that the plane of said orifice has the perpendicular axis thereof directed toward the rear and lowermost portion of said chamber such that the flow of pellitized matter is directed toward the rear of said chamber, the nearestmost lip of said orifice positioned with respect to the bottom of said agitation chamber to restrict forward flow and facilitating clumping of the pellitized matter.

* * * * *